(No Model.) 2 Sheets—Sheet 2.
H. T. MURTHA.
TIRE TIGHTENER.
No. 442,272. Patented Dec. 9, 1890.
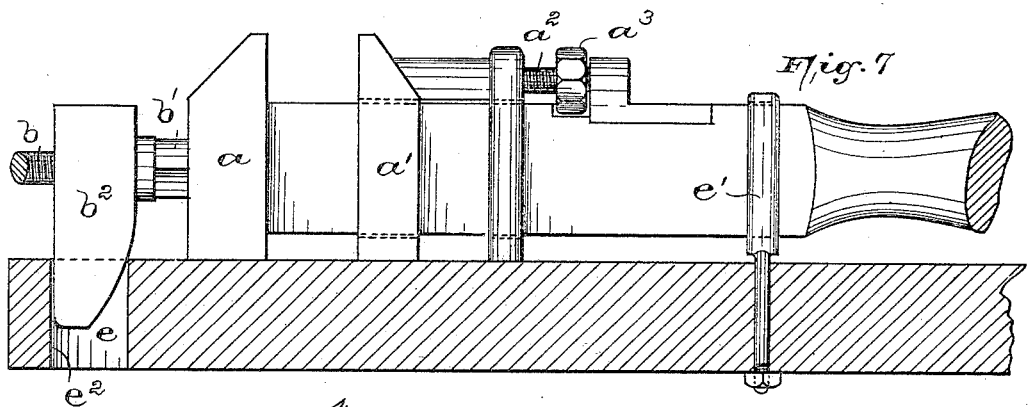
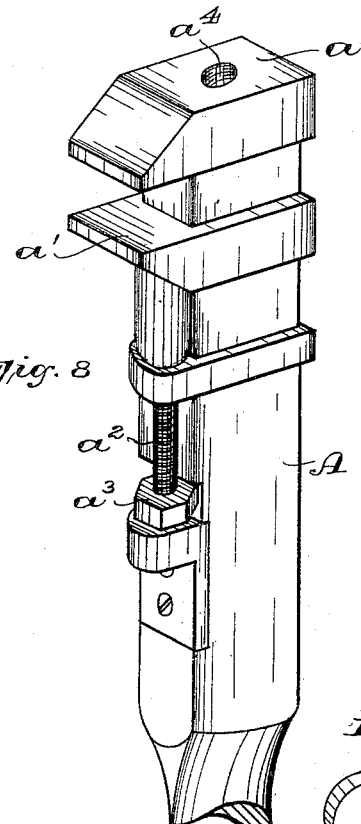
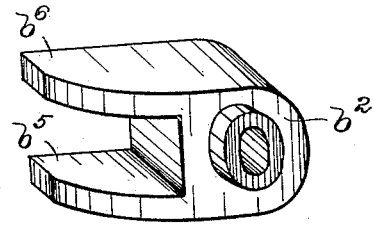
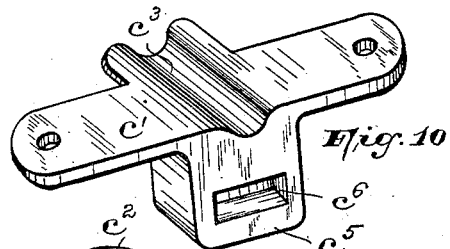
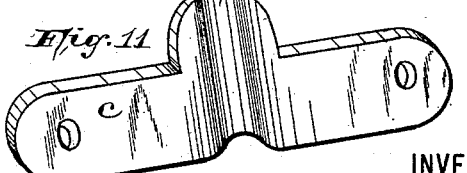
WITNESSES:
INVENTOR:
Harry T. Murtha.
BY Fred. C. Fraentzel, ATTY.

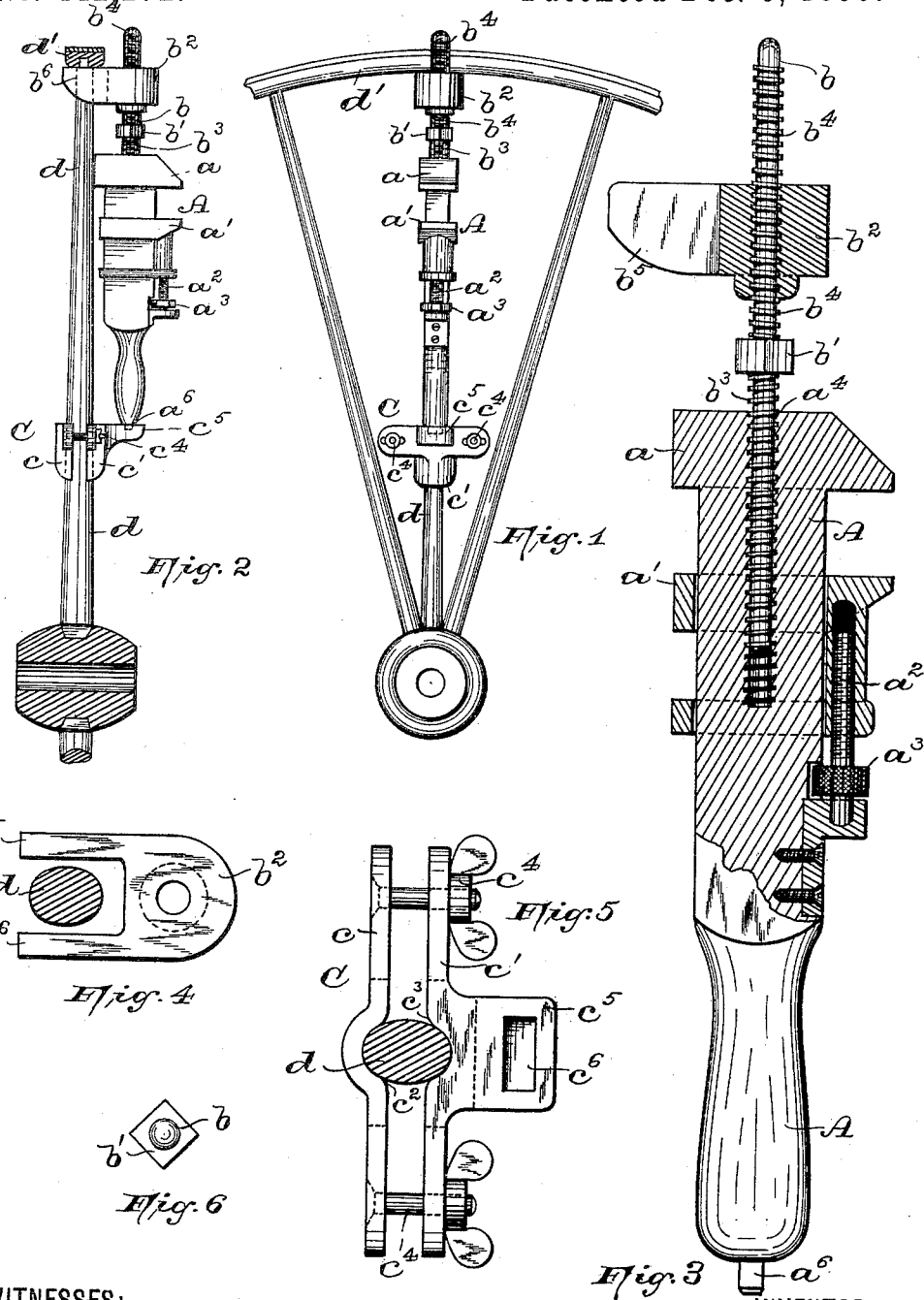

UNITED STATES PATENT OFFICE.

HARRY T. MURTHA, OF NEWARK, NEW JERSEY, ASSIGNOR OF ONE-HALF TO RODNEY W. PRIDHAM, OF SAME PLACE.

TIRE-TIGHTENER.

SPECIFICATION forming part of Letters Patent No. 442,272, dated December 9, 1890.

Application filed July 9, 1890. Serial No. 358,135. (No model.)

*To all whom it may concern:*

Be it known that I, HARRY T. MURTHA, a citizen of the United States, residing at Newark, in the county of Essex and State of New Jersey, have invented certain new and useful Improvements in Tire-Tighteners; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to an improved tire-tightening device; and it consists of the peculiar arrangement and construction of the several parts, as will be hereinafter more fully set forth, and finally embodied in the clauses of the claim.

In the accompanying two sheets of drawings, in which similar letters of reference indicate corresponding parts in each of the several views, Figure 1 is a view of part of a wheel, illustrating the manner of attaching the tool to the spokes when used as a tire-tightener. Fig. 2 is a side view of the device and the spoke, illustrating more clearly than is shown in Fig. 1 the manner of attaching the tool. Fig. 3 is an enlarged vertical section of the tool, showing the several parts in operative position thereon. Fig. 4 represents a top view of the tire-tightening jaw; and Fig. 5 is a similar view of a socketed clamping device, illustrating the manner of attaching the same to a spoke, which is shown in section. Fig. 6 is an end view of a right and left screw used in connection with the tool and provided with a nut portion for applying an ordinary tool-wrench to raise and lower the tire tightening or lifting jaw. On Sheet 2 Fig. 7 shows the manner of securing the tool to a bench, when it can be used as a vise. Fig. 8 is a perspective view of the tool with the lifting-jaw and screw removed therefrom, which adapts the tool for ordinary use as a monkey-wrench. Fig. 9 is a perspective view of the tire tightening or lifting jaw, and Figs. 10 and 11 are like views of the clamping device.

The tool shown in said views consists of a main portion or monkey-wrench A, provided with the jaws $a$ and $a'$, one of which slides upon the main portion or body of the wrench, and is operated by means of a screw $a^2$ and a finger-piece or nut $a^3$ in the usual manner.

The upper jaw $a$, which is preferably a fixed jaw, is provided in its end with a threaded perforation $a^4$, extending part way into the body portion, and into which is fitted a threaded pin $b$, provided with a nut portion $b'$ and having secured to said pin above the nut a lifting piece or jaw $b^2$. Said pin, as is shown more especially in Fig. 3, is provided on opposite sides of the nut portion $b'$ with the right and left threads $b^3$ and $b^4$, one of which, as $b^3$, screws into the body portion A of the wrench, while the thread $b^4$ is provided with the lifting-jaw $b^2$.

In order to use the tool as a tire-tightener, I have provided the handle portion $a^5$ of the wrench with a projection $a^6$, which fits into the socketed clamping device C, attached to the spoke of the wheel. Said clamping device consists of two clamping-jaws $c$ and $c'$, provided with the curved portions $c^2$ and $c^3$, adapted to be placed upon opposite sides of the spoke $d$ and held in place thereon by ordinary bolts or thumb-screws $c^4$, as clearly shown in Figs. 1, 2, and 5. One of the jaws $c'$ is provided with a step or rest $c^5$, having a recess or hole $c^6$ therein, as shown in Figs. 5 and 10, which forms a socket for the reception of the projection $a^6$ on the end of the wrench. Instead of providing the handle of the wrench with such a projection, the same can be dispensed with and said socket made large enough to receive the entire end of the handle, as will be evident.

The operation of the device when used as a tire-tightener is as follows: After having attached the clamping device C in its proper position upon a spoke $d$, as has just been described, and as clearly shown, the end of the handle of the wrench is placed in the socketed step or rest $c^5$, as shown in Figs. 1 and 2, and by placing an ordinary tool-wrench around the nut portion $b'$ on the threaded pin $b$ the lifting-jaw $b^2$, which is provided with opposite projecting arms $b^5$ and $b^6$, and which are caused to embrace the spoke, (see Fig. 4,) is made to move upon its threaded portion $b^4$ against the under side of the felly $d'$ of the wheel, while at the same time the threaded portion $b^3$ in the head of the wrench is screwed out therefrom, thus causing a double power to be exerted against the felly, and thereby successfully tightening the latter. If desirable, instead of using a thread $b^4$ upon the upper end of the pin $b$, said end can be left perfectly smooth and the lifting-jaw $b^2$ loosely fitted thereon, so that it can turn on the said end, as will be understood. When the felly of a wheel has shrunk considerably, as is often the case, the tightening-tool is thus applied to every second or third spoke in succession, omitting one or two, as the case may be, whereby the felly becomes stretched, and at the same time the tenons on the different spokes are tightly driven home into their respective mortises in the felly.

On Sheet 2 in Fig. 7 I have shown the use of the tool as an ordinary vise. As shown, the bench-top is provided with a perforation or hole $e$, and into the same is fitted the lifting-jaw $b^2$, while around the body portion A, I can arrange a clip $e'$ or any other suitable means for fastening the tool to the table. Then by tightening up on the pin $b$ by means of the nut portion $b'$ the jaw $b^2$ is firmly held against the surface $e^2$ in the perforation $e$, and the tool is tightly held in place upon the table. The jaws $a$ and $a'$ are then used as vise-jaws, and are operated by means of the screw $a^2$ and its nut $a^3$ with an ordinary tool-wrench.

From Fig. 3 it will be seen that the tool can be used as a lifting-jack, the jaw $b^2$ serving as a support for the body to be raised or lowered. When the screw or pin $b$ and its jaw $b^2$ are removed from the body portion A, the tool can be conveniently handled as an ordinary monkey-wrench.

From the construction shown more especially in Figs. 1, 2, and 3 it will be seen that the lifting-jaw is readily adjustable, adapting the tool for its use as a tire-tightener, lifting-jack, and a vise, and by providing the pin $b$ with the right and left threads a very powerful tool is the result when in operation.

This simple and inexpensive raising and lowering attachment increases the value and utility of the tool without materially increasing the expense of the same.

Having thus described my invention, what I claim is—

1. The herein-described tire-tightener, consisting of a body portion A, provided with a fixed jaw $a$ and a sliding jaw $a'$, a threaded perforation in one end of the body portion, a threaded pin in said perforation, a lifting-jaw on said threaded pin, adapted to move thereon, and a projection $a^6$ on the opposite end of said body portion for placing the same in a socketed clamping device adapted to be secured to the spoke of a wheel, as and for the purposes set forth.

2. The herein-described tire-tightener, consisting of a body portion A, provided with a fixed jaw $a$ and a sliding jaw $a'$, a threaded perforation in one end of the body portion, a threaded pin in said perforation, provided with a fixed nut portion, a lifting-jaw moving on said threaded pin, adapted to embrace the spoke of a wheel, and a projection $a^6$ on the opposite end of said body portion for placing the same in a socketed clamping device adapted to be secured to a spoke, as and for the purposes set forth.

3. In a tire-tightener, the combination, with a clamping device adapted to be attached to a spoke of a wheel and provided with a step or rest, of a body portion A, provided with a projection $a^6$, adapted to be removably placed on said step, provided on its upper end with a lifting-jaw arranged on a threaded pin working in a threaded perforation in said end, for the purposes set forth.

4. In a tire-tightener, the combination, with a clamping device adapted to be attached to a spoke of a wheel and provided with a socketed step or rest, of a body portion A, provided with a projection $a^6$, adapted to be removably placed in said socket in the step and provided at its upper end with a lifting-jaw adapted to embrace the spoke, and a pin having a nut portion and a thread $b^3$, working in a perforation in the end of the tool, and a thread $b^4$ on the other end of the said pin, upon which said lifting-jaw reciprocates, for the purposes set forth.

5. In a tire-tightener, the combination, with a clamping device consisting of clamping-jaws $c$ and $c'$, adapted to be attached to a spoke by means of screws, as set forth, one of said jaws having a socketed rest or step, of the body portion having a threaded perforation in its end and a lifting-jaw and means for raising and lowering the same, for the purposes set forth.

In testimony that I claim the invention set forth above I have hereunto set my hand this 7th day of July, 1890.

HARRY T. MURTHA.

Witnesses:
TOM. J. GOFF,
WALTER LEE.